United States Patent [19]
McCombs et al.

[11] 3,837,898
[45] Sept. 24, 1974

[54] GLASS FIBER SIZE COMPOSITION

[75] Inventors: Frank Paul McCombs, Granville; Michael Graeg Roberts, Newark, both of Ohio

[73] Assignee: Owens-Corning Fiberglas Corporation, Toledo, Ohio

[22] Filed: June 19, 1972

[21] Appl. No.: 264,091

[52] U.S. Cl....... 117/72, 117/126 GB, 117/126 GS, 117/126 GN, 260/29.7 H, 260/29.6 GB, 260/29.7 N, 260/29.7 EM
[51] Int. Cl..... B32b 17/02, B32b 17/10, C08d 7/00
[58] Field of Search. 117/126 EB, 126 GS, 126 GN, 117/72

[56] References Cited
UNITED STATES PATENTS

| | | | |
|---|---|---|---|
| 2,952,576 | 9/1960 | Wheelock | 117/126 GS |
| 2,994,619 | 8/1961 | Eilerman | 117/126 GS |
| 3,062,242 | 11/1962 | Vanderbilt | 117/126 GB |
| 3,350,345 | 10/1967 | Vanderbilt et al. | 117/126 GS |
| 3,424,608 | 1/1969 | Marzocchi et al. | 117/126 GB |
| 3,533,768 | 10/1970 | Wong | 117/126 GB |
| 3,567,671 | 3/1971 | Janetas | 117/126 GB |
| 3,676,287 | 7/1972 | Flautt et al. | 117/126 GN |
| 3,702,783 | 11/1972 | Hortlein | 117/126 GS |
| 3,702,798 | 11/1972 | Shannon | 117/126 GB |

OTHER PUBLICATIONS

Vanderbilt et al., "GRP Premixes...," in Rubber and Plastics Weekly, 6-17-61, pp. 910-12,914.

*Primary Examiner*—William D. Martin
*Assistant Examiner*—William H. Schmidt
*Attorney, Agent, or Firm*—Carl G. Staelin; John W. Overman; Keith V. Rockey

[57] ABSTRACT

This invention is addressed to an improved size composition for use in the treatment of glass fibers in the manufacture of glass fiber textiles, glass fiber reinforced plastics and glass fiber reinforced elastomeric products wherein the size is formulated to contain, as the essential ingredients, a polybutadiene, and preferably a low-molecular weight polybutadiene, and a glass fiber anchoring agent. Bundles of glass fibers sized with the composition of the invention are particularly well suited for impregnation with an elastomer compatible material containing a resorcinol-aldehyde resin component and an elastomer component for use in the manufacture of glass fiber reinforced elastomeric products.

In one embodiment, the glass fiber anchoring agent is a mixture of a polyamino silane and hyrolyzable amino-substituted akyl silane. The composition may also contain a polymerizable alkenyl aromatic compound, a heat activated free radical intiator, a thixotropic gel agent, a poly-alpha-olefin or a glass fiber lubricant.

26 Claims, 5 Drawing Figures

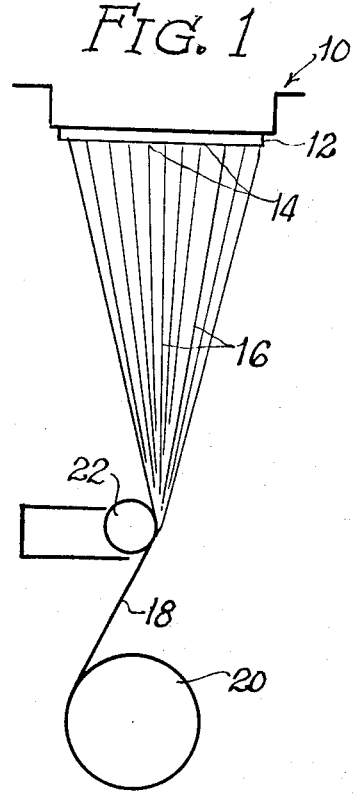
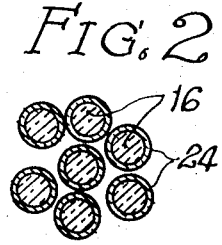
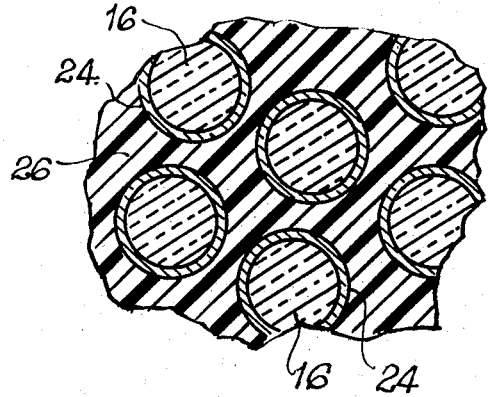
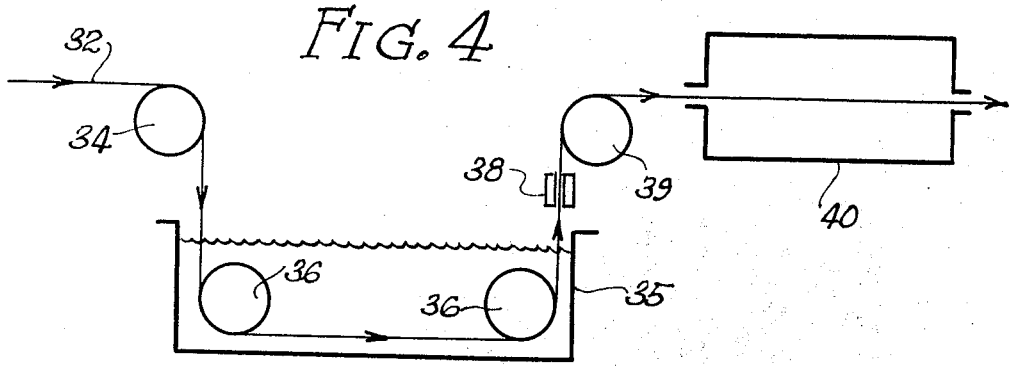
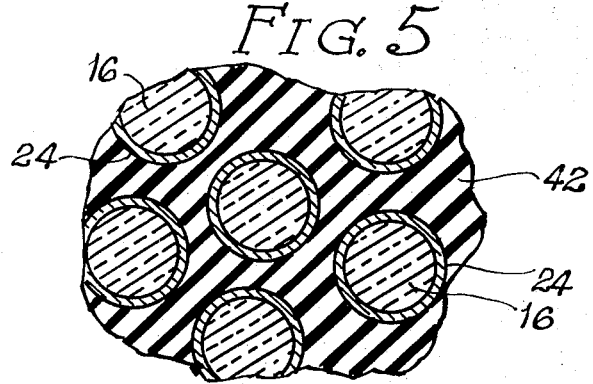

GLASS FIBER SIZE COMPOSITION

This invention relates to a size composition, and more particularly to a size composition for application to glass fibers to improve the processing and performance characteristics of glass fibers in glass fiber textiles, in the manufacture of glass fiber-reinforced elastomeric products and in the manufacture of glass fiber-reinforced plastics.

It is conventional practice in the manufacture of glass fibers to coat the glass fibers, preferably as they are formed, with a size composition to impart to the individual glass fibers the desired degree of lubricity without destroying the fibrous characteristics of the glass fibers. The thin film or size coating applied to the individual glass fiber surfaces serves to protect the fibers from destruction from mutual abrasion as the glass fibers are subjected to subsequent processing, such as in the formation of woven or non-woven fabrics or in the combination of the treated glass fibers with elastomeric and plastic materials in the manufacture of glass fiber-reinforced elastomeric and plastic products.

To the present, the chemical compositions of the sizes used in the treatment of glass fibers have depended, for the most part, on the intended use of the treated glass fibers. For example, if the treated glass fibers are to be used in the manufacture of glass fiber textiles, the size is preferably one which imparts good hand and feel to the fabric. Alternatively, when it is desired to size the glass fibers in forming to protect the glass fibers from destruction through mutual abrasion during weaving or like processing steps and then remove the size after weaving is completed, it is desirable to employ a size which can be removed easily and completely, as by burning the size at an elevated temperature.

When the glass fibers are to be used as reinforcement for elastomeric products as in the manufacture of glass fiber-reinforced drive belts, tires and the like, the size composition is one which is compatible with, and serves to improve the bonding relationship of the glass fibers with, elastomeric materials. As is now well known to the art, the difficulties in bonding glass fibers to elastomeric materials are believed to stem in part from the fact that the glass fibers are completely smooth, rod-like members and in part from the fact that the glass fiber surfaces are highly hydrophilic in nature, thereby resulting in the formation of a thin but tenacious film of water on the glass fiber surfaces which serves to destroy any bond, chemical or physical, which would otherwise be formed between the glass fiber surfaces and the elastomeric material with which the glass fibers are combined.

To minimize the problems in bonding glass fibers to elastomeric materials as described above and to promote a secure bonding relationship between glass fibers and elastomeric materials, the glass fibers are sized, preferably as they are formed, with an elastomer compatible size and are then formed into strands, yarns, cords or fabrics, generally known to the art as bundles, and impregnated with a composition containing an elastomer component to intertie the glass fiber surfaces to the elastomeric material. Thus, the size composition is preferably one which is capable of establishing a bonding relationship with the impregnant to facilitate integration of the impregnated bundle with elastomeric materials.

When the treated glass fibers are for use as reinforcement for resins, such as polyepoxide, polyester, polyamide, melamine, urea or phenolic-aldehyde resins and the like, the size composition is preferably one which is compatible with such resinous systems and which is capable of establishing a secure bonding relationship with such resins.

Because of the different considerations inherent in textiles, glass fiber-reinforced elastomeric products and glass fiber-reinforced plastics, different size compositions which are specific to the intended use of the treated glass fibers have been employed.

It accordingly is an object of the present invention to provide a composition for use in the treatment of glass fibers to improve the processing and performance characteristics of the glass fibers in the manufacture of glass fiber textiles and fabrics, in the manufacture of glass fiber-reinforced elastomeric products and in the manufacture of glass fiber-reinforced resins.

It is a related object of the invention to provide a composition for use in the treatment of glass fibers which is effective to protect the glass fibers during processing and which is capable of being removed easily and completely.

It is another object of the invention to provide a composition for use in the treatment of glass fibers to improve the bonding relationship with elastomeric materials in the manufacture of glass fiber-reinforced elastomeric products.

It is a further object of the invention to provide a composition for use in the treatment of glass fibers to promote compatibility between the treated glass fibers and resins in the manufacture of glass fiber-reinforced plastics.

It is another object of the invention to provide treated glass fibers which can be used in the manufacture of textiles and glass fiber-reinforced elastomeric and plastic products.

These and other objects and advantages of the invention will appear more fully hereinafter and, for purposes of illustration and not of limitation, embodiments of the invention are shown in the accompanying drawing in which:

FIG. 1 is a flow diagram showing the manufacture of continuous glass fibers and the treatment thereof as the glass fibers are formed to form a thin film or size coating on the individual glass fiber filaments to improve the processing and performance characteristics in accordance with the concepts of the invention;

FIG. 2 is a cross-sectional view of glass fibers processed in accordance with the diagram of FIG. 1;

FIG. 3 is a cross-sectional view of glass fibers treated in accordance with the present invention as a reinforcement for resins;

FIG. 4 is a flow diagram illustrating the treatment of glass fibers processed in accordance with the diagram of FIG. 1 subsequent to their being formed into bundles in the manufacture of glass fiber-reinforced elastomeric products; and FIG. 5 is a cross-sectional view of a bundle of glass fibers treated in accordance with the diagram of FIG. 4.

The concepts of the present invention reside in a composition for treatment of glass fibers to form a thin film or coating on the individual glass fiber filaments in which the composition is formulated to contain a butadiene homopolymer in aqueous emulsion and a glass fiber anchoring agent, and preferably a mixture of two or more anchoring agents.

In the practice of the invention, use can be made of an emulsion of polybutadiene which can be prepared by dissolving polybutadiene rubber in a solvent and then emulsifying the resulting solution with water and an emulsifier. It has been found that significantly improved results have been achieved when use is made of a liquid butadiene homopolymer, and preferably a homopolymer having an average molecular weight of 500 to 5000, and most preferably 750 to 3000. Such liquid polybutadienes are commercially available from the Lithium Corporation of America under the trademarks "Lithene QH" and "Lithene QL."

While not equivalent to the butadiene polymers described above, use can also be made of functionally terminated low-molecular weight polymers, such as hydroxy, carboxy, nitrile, etc. terminated butadiene polymers. One such functionally terminated low-molecular weight butadiene polymer is commercially available from Arco chemicals under the trademark "R4 5HT." This particular material is a hydroxy terminated, low-molecular wt. butadiene polymer.

The liquid polybutadienes described above are particularly advantageous since they can be emulsified without the use of an organic solvent. In the preparation of aqueous emulsions of the liquid polybutadiene, the liquid polybutadiene is subjected to vigorous agitation with water in the presence of an emulsifier until the initial water-in-oil emulsion inverts to form a stable emulsion of the liquid polybutadiene in aqueous medium.

A wide variety of conventional emulsifying agents can be used in the practice of the invention. Preferred are the non-ionic emulsifying agents, such as the polyoxyethylene derivatives of fatty acid partial esters of sorbitol anhydrides or the polyoxyethylene derivatives of fatty alcohols containing 8 to 22 carbon atoms or of alkyl substituted phenols wherein the alkyl groups contain 6 to 18 carbon atoms. Such emulsifiers are commercially available and include "Tween 80" from Atlas Chemical Industries, Inc. which is a polyoxyethylene derivative of the trioleate ester of sorbitan, "Tween 60" which is a polyoxyethylene derivative of the stearate ester of sorbitan and available from Atlas, and the "Triton" series of emulsifiers from Rohm and Haas which are polyoxyethylene derivatives of alkyl-substituted phenols.

As will be appreciated by those skilled in the art, anionic and cationic emulsifying agents can also be used in the practice of the invention. Representative of such emulsifying agents are the alkali metal fatty acid sulfates (e.g., sodium lauryl sufate), alkali metal salts of alkyl aryl sulfonates (e.g., sodium alkyl benzene sulfonates) as well as numerous others.

The size composition of the invention is formulated to include at least one glass fiber anchoring agent in the form of an organo silicon compound.

As the organo silicon coupling agent, use can be made of a very wide variety of silicon containing coupling agents known to those skilled in the art to be useful for this purpose. In general, suitable organo silicon compounds include organo silanes containing 1 to 3 readily hydrolyzable groups, such as halogen (bromine, chlorine, fluorine or iodine) or alkoxy having 1–6 carbon atoms, such as methoxy, ethoxy, propoxy, butoxy, etc., and containing at least one organic group attached directly to the silicon atom, with any remaining valences on the silicon atom being taken up by hydrogen. In aqueous solution, such silanes tend to hydrolyze to form the corresponding silanols and/or siloxanes and hence the anchoring agent is present in the aqueous size composition of the invention as the silane, silanol and/or siloxane.

The organic group or groups attached to the silicon atom can be any of a variety of groups including alkyl having 1–10 carbon atoms, such as methyl, ethyl, propyl, hexyl, etc.; alkenyl containing 2–8 carbon atoms, such as vinyl allyl, etc.; cycloalkyl having 4–8 carbon atoms, such as cyclopentyl, cyclohexyl, etc.; aryl containing 6–15 carbon atoms, such as phenyl, napthyl, benzyl, etc., and the halogen, amino, hydroxy, mercapto, glycidoxy or epoxy substituted derivatives thereof. It will be understood that wherein the organo silane contains more than one organic group, the various organic groups attached to the silicon atom can be the same or different from each other.

Representative of the compounds falling within the above group are ethyldichlorosilane, propyltrichlorosilane, n-butyltrimethoxy silane, gamma-aminopropyltrimethoxy silane, delta-aminobutyltriethoxy silane, bis-(gamma-aminopropyl)dimethoxy silane, delta-aminobutylethyldimethoxy silane, beta-hydroxyethyltriethoxy silane, glycidoxypropyltrimethoxy silane, gamma-chloropropyltrichlorosilane, vinyldichlorosilane, gamma-aminoallyltrimethoxy silane, beta-aminovinyltriethoxy silane, 3,4-epoxycyclohexyltrimethoxy silane, 3-aminocyclohexylethyltriethoxy silane, para-aminophenyltriethoxy silane, methacryloxypropyltrimethoxy silane, N-(beta-aminoethyl)-gamma-aminopropyltrimethoxy silane, gamma-mercaptopropyltriethoxy silane, gamma-hydroxypropyltrimethoxy silane, as well as a variety of others. In general, those silanes preferred are those in which at least one organic group is substituted by at least one amino group.

One particularly preferred amino-substituted organo silane which has been found to provide excellent results in the practice of the present invention is a polyfunctional amino-substituted compound having the formula:

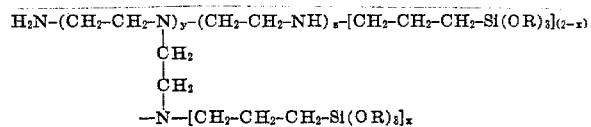

wherein R is a lower alkyl (e.g., methyl, ethyl, propyl), $x$ is an integer between 0 and 2, and $y$ and $z$ are integers. Compounds of the foregoing type are available from Dow Corning Corporation under the trademark Z-6050.

While the organo silicon compounds suitable for use as a coupling agent in accordance with the present invention have been described above with reference to the organo silane, it will be understood by those skilled in the art that the above may also be used in the form of the corresponding silanols and polysiloxane polymers.

It has been found that certain combinations of the foregoing organo silicon compounds in the composition of this invention provide unexpected superior results in the manufacture of glass fiber-reinforced elastomeric products. It is particularly advantageous to employ a combination of the poly-functional amino-substituted compound designated Z-6050 with an aminosubstituted alkyl silane of the formula $$H_2N - (CH_2)_w - Si\ Z_3$$

where $w$ is an integer from 2 to 5 and Z is a readily hydrolyzable group as described above. Preferred is gamma-aminopropyltriethoxy silane.

Another combination of anchoring agents which have been found to provide good results in this invention is a substantially equimolar mixture of

$H_2N - CH_2 - CH_2\ NH - CH_2 - CH_2 - CH_2 - SiZ_3$ and an alkyl silane, such as methyltriethoxy silane. This mixture is available from Dow Corning under the trademark "XZ 85476".

The composition of the invention can be applied to glass fibers as they are formed, or after forming if desired, to form a thin film or coating on the individual glass fiber filaments. The polybutadiene operates as a film former on the glass fiber surfaces and is anchored thereto by means of the anchoring agent or agents described above. Without limiting the present invention as to theory, it is believed that the low molecular weight components tend to cure or cross-link on the glass fiber surfaces as the treated glass fibers are subjected to an elevated temperature, such as during drying of the coated fibers, curing and/or vulcanizing of an elastomeric material in combination with the treated materials or during molding of the treated glass fibers in combination with resinous materials, to form a tough elastomeric film on the fiber surfaces.

It has been found that the coated glass fibers are completely compatible with and can be securely bonded to elastomeric materials in the manufacture of glass fiber-reinforced elastomeric products and to plastic resins in the manufacture of glass fiber-reinforced plastic. In addition, the composition of the invention provides a good fugitive size which can be easily and completely removed after, for example, weaving the sized fibers into fabrics or otherwise forming the treated fibers into textile products. The size can be removed by heating the fibers to a temperature of about 1,500°F to burn off the coating with little or no residue due to the presence of unsaturated groups in the burned coating. The relative proportions of the polybutadiene, emulsifying agent and anchoring agent in the composition of this invention are not critical and can be varied within wide limits. It is generally preferred that the polybutadiene component range from 5 to 30 parts by weight of the composition on a dry basis, and preferably 7 to 25 parts by weight. The amount of emulsifying agent should be an amount sufficient to emulsify the polybutadiene and provide a stable system. It has been found that an amount within the range of 5 to 30 parts by weight on a dry or water-free basis is generally sufficient.

The total amount of anchoring agent can similarly be varied within wide ranges. Usually, an amount within the range of 1.0 to 15, and preferably 2 to 8, parts by weight on a dry or water-free basis is sufficient. When use is made of two or more anchoring agents, each is employed in a weight ratio of within the range of 1/3 to 3 based on the weight of each of the other anchoring agents.

Cure of the polybutadiene film on the glass fiber surfaces can be accelerated by formulating the composition to include a heat activated curing agent to operate as a catalyst in the size coating on the fibers. Preferred curing agents for use in the composition of this invention are the well-known free radical catalysts, such as the organic peroxides (e.g., benzoyl peroxide, lauroyl peroxide, tert-butyldiethyl peracetate, diacetyl peroxide, etc.) as well as inorganic peroxides (e.g., potassium persulfate). Numerous other free radical initiators are known to those skilled in the art and can similarly be used in the practice of the invention.

The amount of free radical initiator, when present in the composition of the invention, can be varied within wide ranges. Normally, an amount of initiator within the range of 0.001 to 0.010 parts by weight, and preferably 0.0015 to 0.009 parts by weight, on a water-free basis is sufficient to effect the desired cure in the polybutadiene component of the composition on activation of the initiator by heating.

When the composition of the present invention is applied to glass fibers for subsequent combination with elastomeric materials in the manufacture of glass fiber-reinforced elastomeric products, it is sometimes desirable to formulate the composition to include a polymerizable alkenyl aromatic compound in the composition. Without limiting this concept of the invention as to theory, it is believed that the alkenyl aromatic compound, which is highly reactive with the butadiene homopolymer component of the composition either with or without the presence of the free radical initiator, is capable of reaction with the polybutadiene component and an elastomeric component of an impregnant or of the continuous phase of a fiber-reinforced elastomeric product to intertie the polybutadiene to the elastomer component.

The presence of the alkenyl aromatic compound in the composition of the invention is also advantageous for treatment of glass fibers in the combination of the treated glass fibers with plastic resins containing ethylenic unsaturation. It is believed that the alkenyl aromatic compound is capable of interreacting with the polybutadiene component of the treated glass fibers and the unsaturated groups of the plastic resins to intertie the glass fiber surfaces to the resin.

Various alkenyl aromatic monomers can be employed in the practice of the invention. Preferred are those compounds containing a benzene or naphthalene nucleus and 1 to 2 alkenyl groups containing 2 to 6 carbon atoms, and preferably 1 to 2 vinyl groups. Representative of such alkenyl aromatic compounds include styrene, alpha-methyl styrene, alpha-chlorostyrene, divinyl benzene, vinyl naphthalene, etc.

The alkenyl aromatic compound, when present in the composition of the invention, is usually employed in an amount within the range of 1 to 40 parts by weight of the composition on a dry basis, although greater or lesser amounts can be employed as desired.

The size composition of the present invention is quite stable and can be stored over long periods of time if desired. The stability of the composition can be further improved by adding thereto a gel agent to adjust the viscosity to a desired level, preferably a viscosity of 100 to 300 cps. The gel agent renders the composition thixotropic and thus provides the additional advantage of maintaining the composition on the glass fiber surfaces as the glass fibers are randomly whipped during the forming process.

As the gel agent, use can be made of a wide variety of materials having thixotropic properties. For this purpose, use is preferably made of gel agents formed of cellulose or cellulose derivatives, including carboxymethyl cellulose as well as lower alkyl and lower alkylene glycol ethers of cellulose or methyl cellulose. For example, use can be made of the dimethyl ether of cellulose, the diethyl ether of cellulose, etc., wherein the alkyl in the ether contains 1–4 carbon atoms, including methyl, ethyl, propyl, etc. As indicated above, use can also be made of lower alkylene glycol ethers of cellulose and methyl cellulose wherein the glycol forming the ether contains 2–4 carbon atoms, including ethylene glycol, propylene glycol and butylene glycol. Representative of suitable cellulose and cellulose derivatives include dimethyl ether of cellulose, ethylene glycol ethers of cellulose, such as hydroxyethyl cellulose marketed by Dow Chemical Company under the trademark XD 1300, propylene glycol ethers of methyl cellulose, which are marketed by Dow Chemical Company under the trade name Methocel HG, methyl cellulose, which is marketed by Dow under the trade name Methocel MC, and butylene glycol ethers of methyl cellulose which are marketed by Dow under the trade name Methocel HB. In addition to the cellulose-type gel agents described above, use can also be made of various other gel agents such as the cross-linked polyacrylamides marketed by Dow Chemical Company under the designation "SA 1300."

The amount of gel agent is not critical and is an amount sufficient to adjust the viscosity to within the desired range. An amount of gel agent within the range of 0.5 to 10 parts is generally sufficient.

Having described the basic concepts of the present invention, reference is now made to the following examples which are provided by way of illustration and not by way of limitation, of the practice of the invention in formulating the composition of the invention and the treatment of glass fibers in accordance with the invention.

EXAMPLE 1

A polybutadiene emulsion is first prepared by mixing 10 parts by weight of a liquid polybutadiene (Lithene QH) having an average molecular weight of about 3000 with about 9.5 parts by weight of an emulsifying agent (Tween 85) and 0.004 parts by weight of benzoyl peroxide.

To the resulting mixture there is added sufficient water to form an emulsion of the liquid polymer in aqueous medium. The emulsion is then admixed with a mixture of water, glass fiber anchoring agents and a gel agent, and the resulting composition is homogenized to form the following composition:

|  | Parts by weight |
| --- | --- |
| Polybutadiene | 10.0 |
| Emulsifying agent | 9.5 |
| Benzoyl peroxide | 0.003 |
| Gamma-aminopropyltriethoxy silane | 3.5 |
| POlyamino silane (Z-6050) | 1.9 |
| Gel agent (hydroxyethyl cellulose) | 2.1 |
| Water | 780.0 |

The composition is found to have a solids content of about 2.80 and a pH of 10.0 to 10.5.

The above composition can be applied to glass fibers, preferably as a size as the glass fibers are being formed, or after a previously applied size has been removed.

Referring now to the schematic diagram of FIG. 1, the glass is melted in a glass melting furnace 10 having a bushing 12 on the bottom side. The bushing is formed with a plurality of openings extending therethrough and the molten glass flows gravitationally through the hundreds of small openings in the bushing to form therein streams 14 which are rapidly attenuated into fine glass filaments 16 by winding the filaments about a rapidly rotating drum 20. The filaments 16 are sized with the composition of Example 1 as they are gathered together to form a strand 18. For this purpose, use is made of an applicator 22 which is illustrated as a roller that is constantly wet with the forming size composition. The filaments of glass are each wet with the size composition as they are gathered together to form the strand 18 that is wound about the drum 20.

The sized strand 18 is allowed to air dry, but drying of the size coating can be accelerated by subjecting the strand to dielectric, microwave, hot gas or radiant drying. It has been found that particularly good results are obtained when the strand 18 is subjected to dielectric drying.

As shown in FIG. 2 of the drawing, the composition forms a very thin coating or film 24 on the individual surfaces of the glass fiber filaments to provide glass fiber having the desired lubricity without destroying the fibrous characteristics or appearance of the glass fibers 16.

The strand 18 of the sized fibers can be processed directly into textile fabrics or can be combined with plastic resins in the manufacture of glass fiber reinforced plastics. When used in the manufacture of glass fiber-reinforced elastomeric products, the strand 18 is preferably plied with other strands and twisted to form yarns, threads or cords which may be used as reinforcement, with or without cutting to shorter lengths, and which can be formed into woven or non-woven fabrics for subsequent combination with elastomeric materials.

EXAMPLE 2

This example illustrates a size composition embodying a glass fiber lubricant.

Using the procedure described in Example 1, a polybutadiene emulsion is prepared using a combination of emulsifier, Tween 85 and Tween 60. The emulsion is then formulated with the balance of the composition including a glass fiber lubrication to form the following:

|  | Parts by weight |
| --- | --- |
| Polybutadiene (Lithene QH) | 10.0 |
| Emulsifying agent (Tween 85) | 5.0 |
| Emulsifying agent (Tween 60) | 5.0 |
| Gamma-aminopropyltrimethoxy silane | 3.7 |
| Polyamino silane (Z-6050) | 2.0 |
| Lubricant (Sulfonated mineral oil, Twitchell 7440 from Emery Chemicals) | 3.0 |

The balance of the composition is water which is present in an amount to adjust the solids content to within the range of 0.5 to 20% by weight. The composition of Example 2 can be applied to form a thin film coating in accordance with the procedure described in Example 1 in an amount sufficient to provide a dry coating constituting from 0.1 to 10% by weight of the fibers.

As desired, a wide variety of glass fiber lubricants can be used in accordance with the concepts of the present invention as illustrated in Example 2. Glass fiber lubricants are well known to those skilled in the art and include fatty acid amines containing 8–36 carbon atoms, such as lauryl amine, stearyl amine, palmityl amine, etc., solubilizable mineral oils, such as sulfonated mineral oils marketed by Emery (e.g., Twitchell 7440) and amides prepared by the reaction of a fatty acid containing 8–36 carbon atoms, such as lauric acid, palmitic acid, oleic acid, linoleic acid with poly (polyoxyethylene) amines. Another lubricant which can be used in the present invention is an amide formed by the reaction of one of the fatty acids mentioned above with a polyamine having the formula:

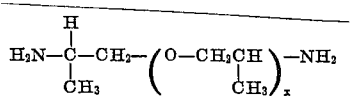

wherein $x$ is an integer. Suitable amines of this type are marketed by Jefferson Chemical and have average molecular weights ranging up to about 2000. The reaction between the fatty acid and the polyamine can be conveniently carried out by admixing the amine with the acid in a molar ratio of at least 2 moles of acid per mole of amine, and heating the mixture to a temperature between 50°–100°C. However, it will be understood by those skilled in the art that a wide variety of other glass fiber lubricants in addition to those specifically described above can be used in accordance with the concepts of the present invention. Similarly, it is possible, and sometimes desirable, to use mixtures of the foregoing lubricants where use is made of a lubricant.

Additional size compositions embodying the concepts of the invention are as follows:

EXAMPLE 3

| | Parts by weight |
|---|---|
| Polybutadiene (Lithene QL) | 8.1 |
| Emulsifying agent (Tween 85) | 8.1 |
| Delta-aminobutyltrimethoxy silane | 3.5 |
| POlyamino silane (Z-6050) | 1.7 |
| Styrene | 6.0 |

EXAMPLE 4

| | Parts by weight |
|---|---|
| Polybutadiene (Lithene QH) | 8.5 |
| Emulsifying agent (Tween 60) | 8.5 |
| Anchoring agent (XZ 85475) | 5.0 |
| Styrene | 8.0 |
| Benzoyl peroxide | 0.005 |

EXAMPLE 5

| | Parts by weight |
|---|---|
| Polybutadiene (Lithene QH) | 8.5 |
| Emulsifying agent (Tween 85) | 8.0 |

EXAMPLE 5-Continued

| | Parts by weight |
|---|---|
| Gamma-aminopropyltrimethoxy silane | 3.4 |
| Polyamino silane (Z-6050) | 1.8 |
| Lubricant (Twitchell 7440) | 3.0 |
| Benzoyl peroxide | 0.003 |

Each of the compositions of Examples 3 to 5 is prepared and used in the treatment of glass fibers in accordance with the procedure described in Example 1. Water constitutes the balance of each composition and is present in an amount sufficient to provide the desired solids content.

As indicated above, use can also be made of higher molecular weight polybutadienes as the film forming component. The use of such polybutadienes is illustrated by the following example:

EXAMPLE 6

Polybutadiene rubber is dissolved in a mixture of tetrahydrofuran and diacetone alcohol and the resulting solution is admixed with a lubricant (Twitchell 7440), styrene, water and anchoring agents. The blend is then homogenized to form the following size composition:

| | Parts by weight |
|---|---|
| Polybutadiene rubber | 8.0 |
| Tetrahydrofuran | 7.0 |
| Diacetone alcohol | 7.6 |
| Styrene | 3.1 |
| Lubricant | 25.0 |
| Gamma-aminopropyltriethoxy silane | 8.4 |
| Polyamino silane (Z-6050) | 4.2 |

Water constitutes the balance of the above and is employed in an amount to adjust the solids content to within the range of 0.1 to 20 percent by weight. The composition can be applied to glass fibers to form a thin size coating thereon in accordance with the procedure described in Example 1.

For some applications of the glass fibers treated in accordance with the present invention it is desirable to increase the stiffness and tensile strength of the treated fibers without destroying the fibrous appearance or characteristics of the treated fibers or otherwise destroying the bonding characteristics of the treated fibers. For this purpose, the compositions of Examples 1 to 6 can be formulated to include a resin component, preferably in aqueous emulsion or suspension, which operates to form a resinous component in thin film on the glass fiber surfaces. A variety of resins can be used for this purpose; preferred are emulsions of polyethylene, polypropylene or other poly-alpha-olefins.

This concept of the invention may be illustrated by the following example:

EXAMPLE 7

Using the procedure described in Example 1, a size composition is formulated as follows:

| | Parts by weight |
|---|---|
| Polybutadiene (Lithene QH) | 8.0 |
| Emulsifying agent | 8.0 |
| [Beta-aminoethyl]-gamma-aminopropyltrimethoxy silane | 4.0 |
| Polypropylene (Icopol OC emulsion) | 4.0 |

Water is added to adjust the solids content to the desired level.

The composition of Example 7 is applied to glass fibers in forming using the procedure described in Example 1. It has been found that the treated glass fibers have increased tensile strength and stiffness with 0.1 to 6 parts by weight of the polyolefin present in the composition.

The glass fibers treated with the compositions of Examples 1 to 7 can be used in the formation of textiles, such as woven and non-woven fabrics, in accordance with conventional processing techniques. If desired, the size can be removed from the fabric after the fabric is formed by simply burning off the thin coating to enable the fibers to be subjected to drying or other processing steps.

Alternatively, the fibers treated with one of the compositions of Example 1 to 7 can be directly combined with plastic resins in the manufacture of glass fiber reinforced plastics, laminates, coated fabrics and the like. The thin film coating of the invention on the surfaces of the individual glass fiber filaments operates to securely anchor the glass fibers to the plastic resin. A cross-sectional view of a laminate embodying glass fibers treated with a composition of this invention is shown in FIG. 3 of the drawing. The glass fibers 16 having the thin coating 24 formed from the composition of the invention are distributed through a plastic resin 26 constituting a continuous phase.

In the preferred use, glass fibers which have been treated in accordance with the present invention are employed as reinforcement for elastomeric materials in the manufacture of glass fiber-reinforced elastomeric products such as tires, drive belts, V-belts, etc. Glass fibers having a size coating thereon embodying the concepts of this invention can be combined directly with elastomeric materials without further processing whereby the coating formed of the butadiene homopolymer and the anchoring agent serves to securely bond the glass fiber surfaces to the elastomeric material.

The polybutadiene component of the coating is capable of undergoing curing and/or vulcanization with the elastomeric material constituting the continuous phase. The presence of the free radical initiator and/or alkenyl aromatic compound in the coating serves to further enhance the integration of the glass fibers with the elastomeric material constituting the continuous phase.

However, it is frequently preferred to form the fibers treated with the size composition of this invention into cords formed of two or more strands of sized fibers which have been plied and twisted together, yarns, threads or fabrics, referred to as bundles, and subject the bundles of sized fibers to impregnation with an elastomer compatible material.

It has been found in accordance with a further concept of the invention that the size composition of this invention is particularly effective in promoting a strong bonding relationship with elastomeric materials in the manufacture of glass fiber reinforced elastomeric materials where bundles of glass fibers which have been sized with the composition of the invention are impregnated with the impregnating composition described in copending application Ser. No. 230,723, filed Mar. 1, 1972, now U.S. Pat. No. 3,787,224. The impregnating composition described in this copending application is formulated to include, as essential components, a resorcinol-aldehyde resin, a vinyl pyridine-butadiene-styrene terpolymer, a microcrystalline paraffin wax and a dicarboxylated butadiene-styrene copolymer resin.

This concept of the invention may be illustrated by the following examples:

EXAMPLE 8

Using the procedure described in the above application, an impregnating composition is formulated as follows:

| Impregnating Composition | |
|---|---|
| | Total parts by weight |
| Resorcinol-formaldehyde resin latex (Penacolite R 2170 – 75% solids) | 48 |
| Vinyl pyridine-butadiene-styrene terpolymer latex (Gentac FS – 42% solids) | 900 |
| Dicarboxylated butadiene-styrene resin (Pliolite 4121 – 50% solids) | 350 |
| Microcrystalline paraffin wax (Vultex Wax Emulsion No. 5 – 56% solids) | 100 |
| Water | 832 |

Impregnation with the aqueous composition of Example 8 can be carried out by way of any of a variety of known techniques for the impregnation of glass fiber bundles. Referring specifically to FIG. 4 of the drawing, a bundle 32 formed of a plurality of glass fibers which have been sized with one of the compositions of Examples 1 to 7 is passed over a guide roller 34 for passage downwardly into an impregnating bath 35 containing the aqueous impregnating composition of Example 8. The bundle is then passed under a pair of rollers 36 to effect a sharp bend in the bundle which operates to open the bundle to facilitate more complete penetration of the aqueous treating composition in the bundle of glass fibers for complete impregnation of the bundle. The impregnated bundle is then raised from the bath for passage through a roller or die 38 which operates to remove excess treating composition from the bundle and to work the treating composition into the bundle. Thereafter, the endless bundle is advanced over roller 39 into a drying oven 40, such as a dielectric, microwave, hot gas, or radiant oven maintained at a temperature above ambient temperature, and preferably a temperature within the range of 65°–180°F to accelerate removal of the aqueous diluent and to set the impregnant in situ in the glass fiber bundle. Drying will occur within a relatively short period of time, generally within 0.1 sec. to 10 min., depending upon the temperature of drying.

The resulting bundle is shown in cross-section in FIG. 5 of the drawing. As can be seen from this figure, the bundle is formed of a plurality of glass fibers 16 which have the size coating 24 formed from one of the components of Examples 1 to 7 on the surfaces of the individual filaments. The impregnant 42 in the form of the solids from the treating composition of Example 8 completely penetrates the bundle and serves to separate the glass fibers each from the other to form a unitary bundle structure.

The relative proportions of the components of the impregnating composition of Example 5 can be varied within wide limits; preferred proportions are set forth in the following general example:

EXAMPLE 9

| | Parts by weight solids |
|---|---|
| Resorcinol-formaldehyde resin | 2 – 10 |
| Butadiene-styrene vinyl pyridine terpolymer | 20 – 60 |
| Dicarboxylated butadiene-styrene resin | 15 – 40 |
| Microcrystalline paraffin wax | 3 – 30 |

The balance of the foregoing composition is water and the amount of water is adjusted to provide a solids content within the range of 20 to 55% by weight. Application of the impregnating composition is usually made in an amount sufficient to deposit in the sized fiber bundle dry solids constituting from 10 to 25% by weight of the fiber system.

While not equivalent to the compositions of Examples 8 and 9, use can be made of other impregnating compositions known to those skilled in the art. Such compositions are generally formulated to contain 2 to 10 parts by weight of a resorcinol-aldehyde resin component and 20 to 60 parts by weight of at least one elastomer component. For a further description of such compositions, reference can be made to U.S. Pat. Nos. 3,567,671 and 3,591,357.

In facilitating the combination of glass fibers treated in accordance with the present invention with elastomeric materials, the individual glass fibers containing a coating on the surfaces thereof from Examples 1 to 7 or bundles of glass fibers sized with one of the compositions of Examples 1 to 7 and impregnated as described above are mixed with elastomeric material or otherwise laid down in the desired arrangement for combination with the elastomeric material, as in the manufacture of glass fiber-reinforced belts or in the manufacture of rubber tires reinforced with cords of glass fibers. The combination of glass fibers and elastomeric material is processed in a conventional manner by mold or cure under heat and compression or vulcanized for advancement of the elastomeric material to a cured or vulcanized stage while in combination with the treated glass fibers or bundles of glass fibers whereby the glass fibers or bundles of glass fibers become strongly integrated with the elastomeric materials in the glass fiber-elastomeric product.

In the final system, the elastomeric material with which the glass fibers or bundles of glass fibers are combined, constitutes a continuous phase. Such continuous phase elastomeric materials may comprise elastomers or rubbers of the type incorporated into the treating compositions or the elastomeric material can differ therefrom. It is believed that the tie-in between the individually coated glass fibers or the impregnated bundles of glass fibers and the elastomeric materials forming the continuous phase occurs primarily during cure or vulcanization of the elastomeric material in combination with the treated glass fibers.

It will be apparent that various changes and modifications can be made in the detail of procedure, formulation and use without departing from the spirit of the invention, especially as defined in the following claims.

We claim:

1. Glass fibers having a thin film coating thereon, said coating consisting essentially of a mixture of 5 to 30 parts by weight of a polybutadiene having an average molecular weight within the range of 500 to 5000 and 1 to 15 parts by weight of an organo silicon compound in the form of a mixture of (1) a silane of the formula

wherein Z is a lower alkoxy group and $w$ is an integer from 2 to 5, and (2) a compound having the formula

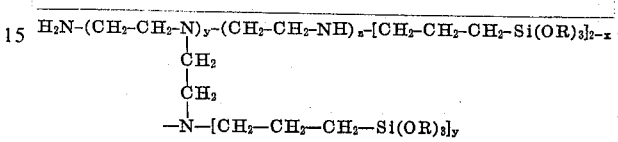

wherein R is lower alkyl, $x$ is an integer from 0 to 2, and $y$ and $z$ are integers, and the hydrolysis products thereof, with the weight ratio of (1) to (2) being within the range of 1:3 to 3:1.

2. Glass fibers as defined in claim 1 wherein the coating also includes a polymerizable alkenyl aromatic compound.

3. Glass fibers as defined in claim 1 wherein the coating also includes a heat-activated free radical initiator.

4. Glass fibers as defined in claim 1 wherein the coating also includes a thixotropic gel agent.

5. Glass fibers as defined in claim 1 wherein the coating also includes a poly-alpha-olefin.

6. Glass fibers as defined in claim 1 wherein the coating also includes a glass fiber lubricant.

7. A glass fiber bundle comprising a plurality of glass fibers, each of said fibers having a thin film coating on the individual surfaces thereof, said coating consisting essentially of a mixture of 5 to 30 parts by weight of a polybutadiene having an average molecular weight within the range of 500 to 5000 and 1 to 15 parts by weight of an organo silicon compound in the form of a mixture of (1) a silane of the formula

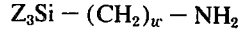

wherein Z is a lower alkoxy group and $w$ is an integer from 2 to 5, and (2) a compound having the formula

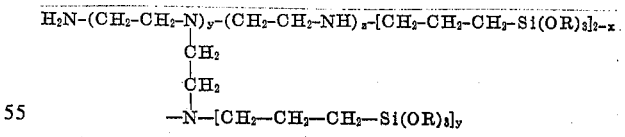

wherein R is lower alkyl, $x$ is an integer from 0 to 2, and $y$ and $z$ are integers, and the hydrolysis products thereof, with the weight ratio of (1) to (2) being within the range of 1:3 to 3:1, and an impregnant in the bundle, said impregnant comprising a blend of a resorcinol-aldehyde resin and an elastomer.

8. A bundle as defined in claim 7 wherein the coating also includes a polymerizable alkenyl aromatic compound.

9. A bundle as defined in claim 7 wherein the coating also includes a heat-activated free radical initiator.

10. A bundle as defined in claim 7 wherein the coating also includes a thixotropic gel agent.

11. A bundle as defined in claim 7 wherein the coating also includes a poly-alpha-olefin.

12. A bundle as defined in claim 7 wherein the coating also includes a glass fiber lubricant.

13. A glass fiber bundle comprising a plurality of glass fibers, each of said fibers having a thin film coating on the individual surfaces thereof, said coating consisting essentially of a mixture of 5 to 30 parts by weight of a polybutadiene having an average molecular weight within the range of 500 to 5000 and 1 to 15 parts by weight of an organo silicon compound in the form of a mixture of (1) a silane of the formula

wherein Z is a lower alkoxy group and $w$ is an integer from 2 to 5, and (2) a compound having the formula

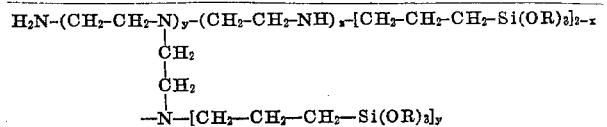

wherein R is lower alkyl, $x$ is an integer from 0 to 2, $y$ and $z$ are integers, and the hydrolysis products thereof, with the weight ratio of (1) to (2) being within the range of 1:3 and 3:1, and an impregnant in the bundle, said impregnant comprising 2 to 10 parts by weight of a resorcinol-aldehyde resin, 20 to 60 parts by weight of a vinyl pyridine-butadiene-styrene terpolymer, 15 to 40 parts by weight of a dicarboxylated butadiene-styrene resin and 3 to 30 parts by weight of a microcrystalline wax.

14. A glass fiber bundle as defined in claim 13 wherein the fibers forming the bundle are in the form of strands which have been plied and twisted together.

15. In a glass fiber reinforced elastomeric product wherein an elastomeric material constitutes a continuous phase in which the glass fibers are distributed, the improvement in the bonding relationship between the glass fibers and the elastomeric material comprising a coating on the individual glass fibers, said coating consisting essentially of a mixture of 5 to 30 parts by weight of a polybutadiene having an average molecular weight within the range of 500 to 5000 and 1 to 15 parts by weight of an organo silicon compound in the form of a mixture of (1) a silane of the formula

wherein Z is a lower alkoxy group and $w$ is an integer from 2 to 5, and (2) a compound having the formula

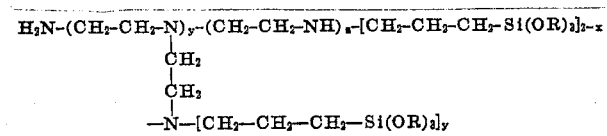

wherein R is lower alkyl, $x$ is an integer from 0 to 2, and $y$ and $z$ are integers, and the hydrolysis products thereof, with the weight ratio of (1) to (2) being within the range of 1:3 to 3:1.

16. In a glass fiber reinforced elastomeric product as defined in claim 15 wherein the coating also includes a polymerizable alkenyl aromatic compound.

17. In a glass fiber reinforced elastomeric product as defined in claim 15 wherein the coating also includes a heat-activated free radical initiator.

18. In a glass fiber reinforced elastomeric product as defined in claim 15 wherein the coating also includes a thixotropic gel agent.

19. In a glass fiber reinforced elastomeric product as defined in claim 15 wherein the coating also includes a poly-alpha-olefin.

20. In a glass fiber reinforced elastomeric product as defined in claim 15 wherein the coating also includes a glass fiber lubricant.

21. In a glass fiber reinforced elastomeric product wherein an elastomeric material constitutes a continuous phase in which the glass fibers are distributed, the improvement in the bonding relationship between the glass fibers and the elastomeric material comprising bundles of glass fibers, each of the glass fibers having a thin size coating on the individual surfaces thereof, said coating consisting essentially of a mixture of 5 to 30 parts by weight of a polybutadiene having an average molecular weight within the range of 500 to 5000 and 1 to 15 parts by weight of an organo silicon compound in the form of a mixture of (1) a silane of the formula

wherein Z is a lower alkoxy group and $w$ is an integer from 2 to 5, and (2) a compound having the formula

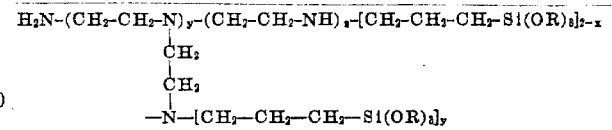

wherein R is lower alkyl, $x$ is an integer from 0 to 2, and $y$ and $z$ are integers, and the hydrolysis products thereof, with the weight ratio of (1) to (2) being within the range of 1:3 to 3:1, and an impregnant in the bundle, the impregnant comprising a resorcinol-aldehyde resin and an elastomer.

22. In a glass fiber reinforced elastomeric product as defined in claim 21 wherein the coating also includes a polymerizable alkenyl aromatic compound.

23. In a glass fiber reinforced elastomeric product as defined in claim 21 wherein the coating also includes a heat-activated free radical initiator.

24. In a glass fiber reinforced elastomeric product as defined in claim 21 wherein the coating also includes a thixotropic gel agent.

25. In a glass fiber reinforced elastomeric product as defined in claim 21 wherein the coating also includes a poly-alpha-olefin.

26. In a glass fiber reinforced elastomeric product as defined in claim 21 wherein the impregnant comprises 2 to 10 parts by weight of a resorcinol-aldehyde resin, 20 to 60 parts by weight of a vinyl-pyridine butadiene-styrene terpolymer, 15 to 40 parts by weight of a dicarboxylated butadiene-styrene resin and 3 to 30 parts by weight of a microcrystalline wax.

* * * * *